United States Patent [19]

Nakajo

[11] Patent Number: 5,502,702
[45] Date of Patent: Mar. 26, 1996

[54] OPTICAL DISC RECORDING DEVICE USING BASIC RECORDING INFORMATION AND PROJECTION TIME CONTROL

[75] Inventor: Yukihisa Nakajo, Hamamatsu, Japan

[73] Assignee: Yamaha Corporation, Hamamtsu, Japan

[21] Appl. No.: 286,755

[22] Filed: Aug. 5, 1994

[30] Foreign Application Priority Data

Aug. 9, 1993 [JP] Japan .................................. 5-218194
Nov. 9, 1993 [JP] Japan .................................. 5-303343

[51] Int. Cl.⁶ .................................................. G11B 3/90
[52] U.S. Cl. ............................................ 369/58; 369/116
[58] Field of Search ..................... 369/58, 116, 275.4, 369/13, 59, 54, 53, 52, 47; 360/25, 27

[56] References Cited

U.S. PATENT DOCUMENTS

| | | | |
|---|---|---|---|
| 4,688,203 | 8/1987 | Koishi et al. | 369/58 |
| 5,042,020 | 8/1991 | Endo | 369/116 |
| 5,136,569 | 8/1992 | Fennema et al. | 369/116 |
| 5,289,451 | 2/1994 | Ashinuma et al. | 369/116 |
| 5,295,125 | 3/1994 | Oonishi et al. | 369/58 |
| 5,381,392 | 1/1995 | Hira | 369/58 |

FOREIGN PATENT DOCUMENTS

| | | | |
|---|---|---|---|
| 63-18524 | 1/1988 | Japan | 369/58 |
| 2-23534 | 1/1990 | Japan | |
| 4-87029 | 3/1992 | Japan | |

*Primary Examiner*—Georgia Y. Epps
*Assistant Examiner*—Tan Dinh
*Attorney, Agent, or Firm*—Loeb and Loeb

[57] ABSTRACT

An optical disc recording device includes a control information memory storing a plurality of control information concerning a laser modulation system used during a recording mode for plural types of discs and a recording control circuit for inputting information of the disc type of a disc-on which recording is to be made, reading out information corresponding to the input information from the memory and carrying out contents of a control designated by the control information to achieve recording. In one aspect of the invention, for forming pits of recording pit lengths of 3T to 11T on a CD-WO optical disc using a phthalocyanine dyestuff as a recording material, the recording control circuit includes a projection time control circuit for controlling projection time of recording laser beam with respect to a pit length nT of a pit to be formed to $$(n-J)T - \alpha(nT)$$

where n is 3 to 11
j is a constant and
$\alpha(3T) \geq \alpha(4T) \geq \alpha(5T) \geq \ldots \geq \alpha(11T)$
$\alpha(3T) \geq \alpha(11T)$.

10 Claims, 11 Drawing Sheets

5,502,702

OPTICAL DISC RECORDING DEVICE USING BASIC RECORDING INFORMATION AND PROJECTION TIME CONTROL

BACKGROUND OF THE INVENTION

This invention relates to an optical disc recording device for recording information on an optical disc and, more particularly, to an optical disc recording device capable of recording information easily on an optical disc regardless of difference in the type of an optical disc caused by difference in a recording material used for the optical disc or other factor.

There is a recordable optical disc called a CD-WO disc (write once type disc of the CD format) which is used for recording various information including music information.

A material selected from various materials is used for forming a recording layer of a CD-WO disc. One of these materials is a dyestuff. A recording power (power of laser beam required for recording, i.e., recording sensitivity) differs depending upon the type of dyestuff. On the other hand, it is required for a recording device to perform recording of information on a disc always in an optimum recording state no matter how the material of the recording layer is different and, therefore, parameters including the recording power (generally referred to as "write strategy") need to be adjusted depending upon the type of an optical disc used.

In a prior art recording device, a test writing is made by using a portion which is inner of a lead-in area of an optical disc on which information is to be recorded, the recorded information is reproduced and a recording power at a time point when the best reproduced signal is obtained is selected, and this selected recording power is determined as one to be used for actual recording. The test writing is made, for example, by recording a test pattern consisting of a combination of 11T-11T and 3T-3T while changing the recording power gradually by a 0.3 mW to 0.5 mW step. Then, this recorded test pattern is reproduced and asymmetry (a parameter for assessing the quality of a recorded signal) is obtained from the reproduced waveform of 11T-11T and 3T-3T for each recording power. A recording power at a time point when a desired asymmetry has been obtained is selected and the recording power used for actual recording is determined at this recording power.

In the above described optical disc recording device in which a recording power is determined by test writing, it is rather troublesome to determine the recording power. Particularly, in a case where there is a parameter other than the recording power which must be adjusted (e.g., amounts of shifting of timings of starting and ending recording of a signal to be recorded and an amount of correction of laser beam projection time etc.), it is extremely difficult for a user to set an optimum state by the test writing.

It is, therefore, a first object of the invention to provide an optical disc recording device capable of recording information on an optical disc easily regardless of difference in the type of the optical disc.

In the CD-WO format, the recording pit length of 3T to 11T (1T=4.3218 MHz=231 ns) is employed. If, however, laser beam of a pulse width which is equal to a pit length of a pit to be formed is used, a pit which is actually formed will be of a pit length which is larger by about 1T than the pit length of the pit to be formed due to heating of the recording material. For preventing this excessive pit length, so-called (n–1) strategy is employed. According to this (n–1) strategy, as shown in FIG. 5, a recording laser beam of a pulse width $(n-1)T+\alpha(nT)$ which is shorter by about 1T than the pit length of a pit to be formed is projected. When, for example, a pit of a pit length of 3T is to be formed, a recording laser beam having a pulse width of 2T+30 ns to 70 ns is used. When a pit of a pit length of 4T is to be formed, a recording laser beam having a pulse width of 3T+20 ns to 40 ns is used. When a pit of a pit length of 5T to 10T is to be formed, a recording laser beam having a pulse width of 4T is used.

For a CD-WO disc, K-factor is used as an index representing an amount of deviation of pit length of an actually formed pit from pit length of a pit to be formed K-factor is determined in the following manner:

$$K\text{-factor} = \frac{\Delta rms + 2 \times \sigma_{3T}}{T_W/2}$$

$$\text{where } \Delta rms = \sqrt{\frac{1}{9} \times \sum_{n=3}^{11} (\Delta n)^2}$$

$\Delta_n$: amount of deviation from the set value of pit length defined as $nT$
$T_W$: jitter margin (= 1/4.3218 MHz = 1T)
$\sigma_{3T}$: jitter of pit formed as 3T K-factor is required to be e.g., 0.8 or below because, when it is too large, a block error tends to be produced in reproduction of a signal. In a cyanine disc, the condition of K-factor being 0.8 or below is satisfied by recording a signal with the above described pulse width of $(n-1)T+\alpha(nT)$. In a phthalocyanine disc, however, recording with the pulse width of $(n-1)T+\alpha(nT)$ has resulted in increased pit deviation between (an amount of deviation of the pit length of an actually formed pit from a standard value) as shown in FIG. 6. According to the standard, the pit deviation is required to be within error ranges of ±40 ns for 3T and ±60 ns for 11T. Pit deviation in the phthalocyanine disc however exceeded these error ranges for 3T and 7T to 11T. For this reason, as shown in FIG. 8, there is likelihood of increase in K-factor with resulting occurrence of a block error.

For reducing K-factor, it is necessary, as shown in FIG. 7, to reduce recording power. For reducing K-factor to a value below 0.8, it is necessary to perform recording with a recording power which is smaller than one within an optimum power range necessary for recording. If, however, recording is made with a recording power smaller than one within an optimum power range, it becomes difficult to form an accurate pit and, as a result, the quality of a signal recorded is deteriorated and the rate of occurrence of error in reproduction increases. Accordingly, when recording is made in a phthalocyanine disc by using the recording laser beam projection time of $(n-1)T+\alpha(nT)$, it is not possible to reduce deviation in pit length of an actually formed pit from a standard pit length while preventing deterioration in the quality of a recorded signal.

It is, therefore, a second object of the invention to provide an optical disc recording device which, in recording a signal on a phthalocyanine optical disc, is capable of reducing an amount of deviation of a pit length of an actually formed pit from a standard value while preventing deterioration in the quality of a recorded signal.

SUMMARY OF THE INVENTION

For achieving the first object of the invention, an optical disc recording device comprises control information storage means for storing a plurality of control information concerning a laser modulation system used during a recording mode for plural types of discs; and recording control means for inputting information of the disc type of an optical disc on which recording is to be made, reading out control information corresponding to the input information from said control information storage means and carrying out contents of a control designated by said control information to achieve recording on the optical disc.

According to the invention, control information concerning a laser modulation system such as recording power for obtaining an optimum recordings rate depending upon the type of an optical disc is stored and read out and used according to the type of the optical disc used whereby the recording state can be easily adjusted to an optimum recording state.

In one aspect of the invention, an optical disc recording device further comprises disc type detection means for detecting the type of the optical disc and generating information of the type of the optical disc.

According to this aspect of the invention, the type of the optical disc is automatically detected and corresponding control information concerning the laser modulation system read out and, therefore, operation for adjusting the recording state is facilitated further.

In one aspect of the invention, in the optical disc recording device, the control information storage means stores basic control information which is irrelevant to the type of the optical disc and the recording control means reads out the basic control information and carries out contents of the basic control information when said disc type detection means has not detected the type of the optical disc.

According to this aspect of the invention, even when the type of the optical disc cannot be detected for the reason that the type of the optical disc is not registered or for other reason, recording can be made by using the basic control information.

For achieving the second object of the invention, in said optical disc recording device forming pits of recording pit lengths of 3T to 11T on a CD-WO optical disc using a phthalocyanine dyestuff as a recording material, said recording control means comprises projection time control means for controlling projection time of a recording laser beam with respect to a pit length nT of a pit to be formed to $(n-J)T-\alpha(nT)$ where n is 3 to 11

J is a constant and $\alpha(3T) \geq \alpha(4T) \geq \alpha(5T) \geq \ldots \geq \alpha(11T)$ $\alpha(3T) \geq \alpha(11T)$.

Experiments made by the inventors of the present invention have revealed that, when the projection time of recording laser beam for recording a signal on a phthalocyanine optical disc is controlled to the above described time, the amount of deviation in the pit length can be reduced without reducing the recording power.

In one aspect of the invention, in the optical disc recording device, when the projection time control means forms pits of the same length, said projection time control means increases the ratio of the $\alpha(nT)$ to the length of 1T at each recording speed increase ratio as the recording speed increase ratio increases.

According to this aspect of the invention, an amount of deviation in the pit length can be reduced without reducing a recording power at each recording speed increase ratio.

In another aspect of invention, in the optical disc recording device, said recording control means further comprises laser power control means for controlling recording power of the recording laser beam, said projection time control means increases the value of J when the recording speed increase ratio decreases and decreases the value of J when the recording speed increase ratio increases, and said laser power control means adjusts the laser power to a value necessary for forming a predetermined pit length under projection time having the adjusted value of J.

According to this aspect of the invention, change in the optimum laser power due to the record speed increase ratio can be prevented whereby jitter and hence crosstalk is reduced and the quality of a recorded signal is improved.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

An embodiment of the invention will now be described with reference to FIGS. 1 to 3. In this embodiment, description will be made about a case where recording is made on a CD-WO optical disc in which a recording layer is constructed of various dyestuffs.

Figure 1:
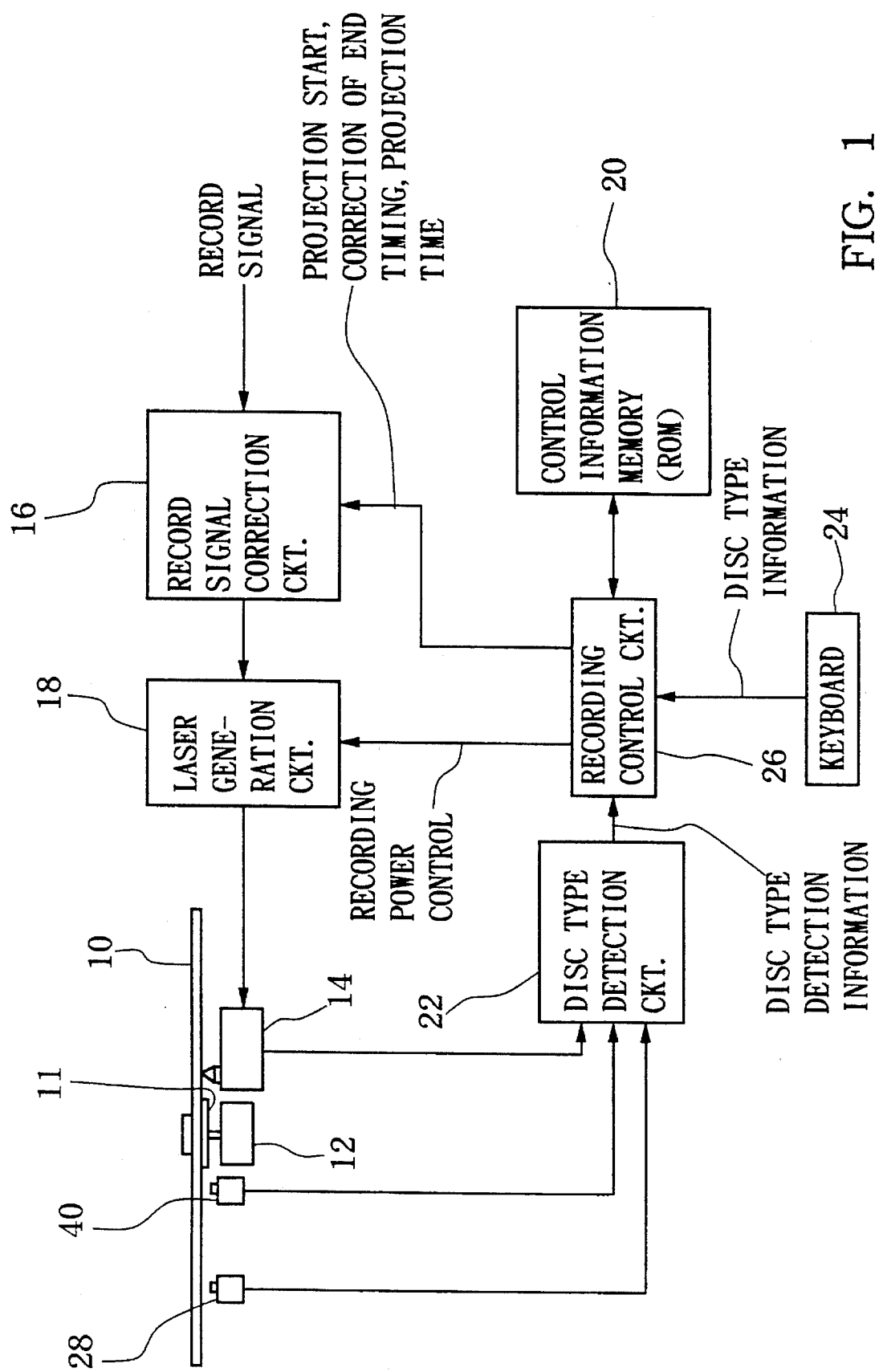
FIG. 1 is a block diagram showing an embodiment of the invention.

In FIG. 1, an optical disc 10 (CD-WO optical disc) is set on a turntable 11 which is rotated by a disc motor 12. Recording and reproduction of information on the optical disc 10 are made by means of laser beam projected by an optical head 14.

If a record signal, i.e., data to be recorded, is used directly to drive a laser diode in the optical head 14 to perform recording, a pit formed tends to become too long or too short and a start position or an end position of a pit formed is shifted from a correct position depending upon the length of an immediately preceding pit portion and the length of an immediately preceding blank portion due to an amount of heat accumulated. This causes jitter which produces an error in reading. For this reason, a signal to be recorded is applied to a record signal correction circuit 16 for correcting a rise timing, fall timing and pulse width depending upon its immediately preceding pit length and its immediately preceding blank length. A corrected record signal is supplied to a laser generation circuit 18. The laser generation circuit 18 modulates a laser drive signal by the record signal and supplies it to the optical head 14 to drive the laser diode therein to project a recording laser beam. The recording laser beam is projected on the recording layer of the optical disc 10 whereby pits are formed on the recording layer and recording of the record signal is thereby performed.

A control information memory 20 is constructed of a ROM (read-only memory) and stores, for each disc type, control information (write strategy) concerning a laser modulation system including a recording power and contents of correction to a record signal for obtaining an optimum recording state. A disc type detection circuit 22 detects the type of an optical disc 10 set on the turntable 11 and produces detection output. A recording control circuit 26 receives, upon setting of an optical disc 10 on the turntable 11, the disc type detection information from the disc type detection circuit 22 and thereupon reads out control information for a corresponding disc from the control information memory 20 and performs recording on the optical disc 10 by setting contents of correction in the record signal correction circuit 16 and the level of the laser drive signal (i.e., recording power) in the laser generation circuit 18. Thus, an optimum recording quality is always obtained regardless of difference in the type of the optical disc 10.

Specific examples of a manner of detecting the disc type by the disc type detection circuit 22 will now be described.
(1) Manner 1 of detecting the disc type: Manner using disc type information Data representing the disc type is modulated and recorded in an ATIP signal in a lead-in (TOC) portion or in a test area within the TOC portion (standardized so as to record the disc type information during manufacturing the disc). Data to be recorded includes an identification number of a manufacturer, a disc type code number and a code number representing recording medium (recording material). As shown in FIG. 1, this information is detected when the lead-in portion of the optical disc 10 is read by the optical head 14. According to this manner of detection, the disc type of each individual disc can be detected and recording power and contents of correction etc. can be minutely adjusted. Similar information may be printed in the form of a bar code in the innermost peripheral portion of the optical disc 10 and a similar control can be made by reading this information by means of a bar code reader.

(2) Manner 2 of detecting the disc type: Manner using a disc feature

CD-WO optical discs currently available in the market are listed in the following Table 1:

TABLE 1

| Dyestuff used | Manufacturer | Type | Rate of reflection(%) |
|---|---|---|---|
| phtalocyanine dyestuff (yellowish green) | Company A (with bar code) | A-1 | 33 |
| same as above | Company B | B-1 | 31 |
| cyanine dyestuff (deep green) | Company C | C-1 | 20 |
| same as above | same as above | C-2 | 18 |
| same as above | Company D | D-1 | 24 |
| same as above | Company E | E-1 | 22 |

In the above Table 1, the rate of reflection is a value obtained by using He-Ne laser (wavelength 633 nm).

As shown in Table 1, since the phthalocyanine discs have a reflection rate exceeding 25% and the cyanine discs have a reflection rate below 25% against wavelength of approximately 650 nm, whether a disc to be detected is a phthalocyanine disc or a cyanine disc can be detected by detecting its reflection rate. For detecting the disc type by the reflection rate, as shown in FIG. 1, the disc type detection unit 28 is provided so that it will face a recording surface of the optical disc 10. Laser beam of a predetermined power having wavelength in the vicinity of 650 nm is projected on the optical disc 10 and its reflected beam is received and the reflection rate is measured on the basis of the power of the received beam. Whether the disc is the phthalocyanine disc or the cyanine disc is detected by detecting whether the reflection rate is over 30% or below 25%.

Figure 2:
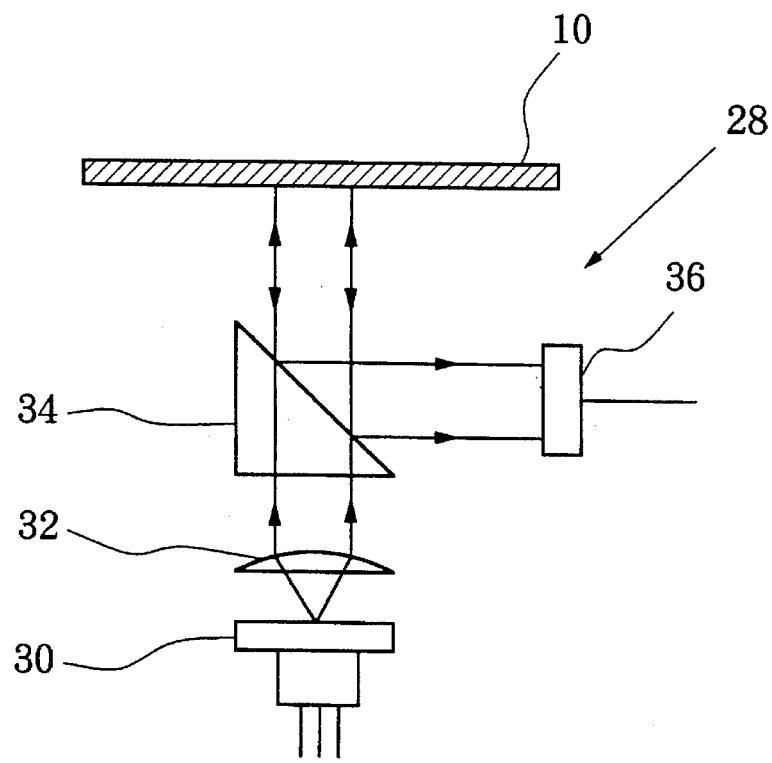
FIG. 2 is a diagram showing an example of a disc type detection unit shown in FIG. 1.
Figure 3:
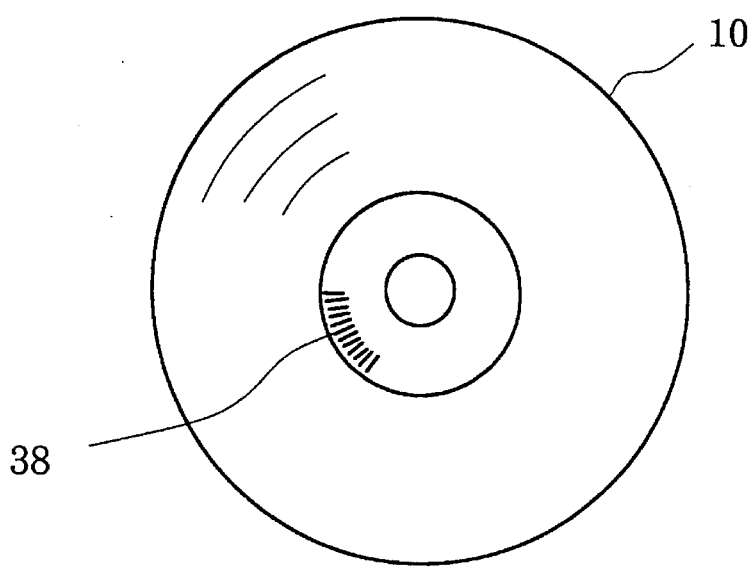
FIG. 3 is a front view of an optical disc on which a bar code is printed.

FIG. 2 shows an example of the disc type detection unit 28. In this example, red laser diode (having wavelenth of 680 nm) or red light-emitting diode (having wavelength of 600 nm to 700 nm) is used as laser source 30. Its projected beam is converted to a parallel beam by a lens 32 and projected on an optical disc 10 through a beam splitter 34. Reflected beam is turned by the beam splitter 34 and received by a laser sensor 36 to detect the power of the received laser beam.

In accordance with the disc type detected, i.e., the phthalocyanine disc or the cyanine disc, the recording control circuit 26 reads out control information for the detected disc type and thereby performs recording control. According to the manner of detection using the reflection rate, it is not possible to detect the manufacturer of the disc but it is still possible to adjust the recording power and contents of correction on the basis of the detected dyestuff.

In Table 1, the disc A-1 of the company A among the phthalocyanine discs has the bar code 38 which is printed on the innermost peripheral portion of the recording surface for identifying the disc number. By detecting presence or absence of the bar code 38, the disc A-1 of the company A can be discriminated from the disc B-1 of the company B and hence recording power and contents of correction can be adjusted more in detail. In a case where this method is used together with the method using the rate of reflection, the bar code reader 40 is disposed in a position in which it faces the innermost peripheral portion of the recording surface of the disc as shown in FIG. 1 to read the bar code 38 (FIG. 3). A commercially available amount of the disc B-1 of the company B is so small that it may be judged by using the bar code 38 only that a disc having the bar code 38 is the disc A-1 of the company A and a disc having no bar code 38 is a cyanine disc.

Since the control information memory 20 (ROM) is mounted on the optical disc recording device (or delivered separately from the device in the form of a ROM card) when the device is delivered from the factory, in a case where data stored in the memory 20 needs to be renewed by reason of, e.g., start of sale of a new disc, such renewal can be achieved by changing the ROM. Alternatively, a RAM having a backup power source may be provided in the optical disc recording device (or provided in a state ready for mounting in the device) as a writable control information memory and a user may write desired control information in the RAM for a new disc. For such writing by the user, upon setting a new disc and detecting the disc type by the disc type detection circuit 22, the user designates address of information of the detected disc type by operating a keyboard 24 of FIG. 1. Then, he inputs control information offered by the manufacturer of the disc and writes the control information at the designated address in the RAM by operating the keyboard 24. By such writing, the disc type of the disc is detected upon setting of the disc and control information is read from the corresponding address in the RAM for performing recording of a record signal on the disc.

For coping with a situation in which the disc type detection circuit 22 cannot detect the disc type (e.g., in a case where the disc type has not been registered yet), general control information which is not the most optimum control information for all types of discs but is acceptable for all of the discs may be stored as basic control information in the control information memory 20 and, when the disc type detection circuit 22 has not detected the disc type, this basic control information may be automatically read out and used for controlling recording of a record signal.

In the above described embodiment, the disc type is automatically detected. Alternatively, the user may detect the disc type by other means and, upon such detection of the disc type, he may input information of the detected disc type by operating the keyboard 24 so as to read out corresponding control information from the control information memory 20.

In the above described embodiment, description has been made about a case where the invention has been applied to recording of information on a CD-WO optical disc. The invention is applicable also to optical disc recording devices for recording information on various other types of optical discs (including rewritable optical discs). The invention is also applicable to reproduction of information from an optical disc when laser beam power etc. need to be controlled in reproduction depending upon the type of an optical disc.

Another embodiment of the invention will be described with reference to FIG. 8 which shows the entire structure of an optical disc recording device according to the invention. In an input device 128, a recording speed increase ratio is set by operation by a user or the like means. A disc servo circuit 116 controls rotation of a disc motor 112 at a constant linear velocity at the set recording speed increase ratio in response to a command given by a system controller 119. Since wobble in the pregroove is standardized so that it will become 22.05 kHz in the case of the CD-WO standard and, the constant linear velocity control can be realized by detecting wobble from an output signal of the optical head 113 (wobble can be detected from a remaining portion of a tracking error signal) and PLL controlling the disc motor 112 so that the wobble will become 22.05 kHz at a normal speed mode, 44.1 kHz at a double speed mode and 88.2 kHz at a four times speed mode.

A focus servo and tracking servo circuit 118 controls, in response to a command from the system controller 119, focus and tracking of laser beam 111 projected by a semiconductor laser in the optical head 113. The tracking control is made by detecting a pregroove formed in the disc 110. A feed servo circuit 117 drives a feed motor 120 in response to a command from the system controller 119 to move the optical head 113 radially on the disc 110.

An input signal to be recorded on the optical disc 110 which is a CD-WO optical disc in which a phthalocyanine dyestuff is used as a recording material is applied to a data signal forming circuit 122 at a speed corresponding to the set recording speed increase ratio, directly in the case of a digital signal or through an analog-to-digital converter 124 in the case of an analog signal. The data signal forming circuit 122 subjects the input data to interleave and imparts the input signal with an error check code as well as TOC information and subcoding information generated by a TOC and subcoding generation circuit 123 and EFM modulates the signal thereby to form and output serial data at a transfer rate corresponding to the CD standard format and recording speed increase ratio.

This data is supplied through a drive interface 115 to a data signal correction circuit 126 for modulation according to the invention and then is supplied to a laser beam generation circuit 125. The laser beam generation circuit 125 drives the semiconductor laser in the optical head 113 to project laser beam on the recording surface of the optical disc 110 and thereby achieve recording by forming a pit. The laser power at this time is designated to a value corresponding to the set recording speed increase ratio and, if necessary, the linear velocity, i.e., laser power necessary for projecting laser beam for forming a pit of a predetermined pit length in a predetermined projection time. The laser power is controlled with high accuracy to this designated value by an ALPC (automatic laser power control) circuit provided in the laser generation circuit 125. Thus, data is recorded on the optical disc 110 with the CD standard format, transfer speed and linear velocity (1.2 m/s to 1.4 m/s).

When reproduction is made by projecting reproducing laser beam (having a smaller power than the recording laser beam) on the optical disc 110, read out data is demodulated by a signal reproduction and processing circuit 130 and provided directly as a digital signal or as an analog signal after being converted by a digital-to-analog converter 132.

Figure 4:
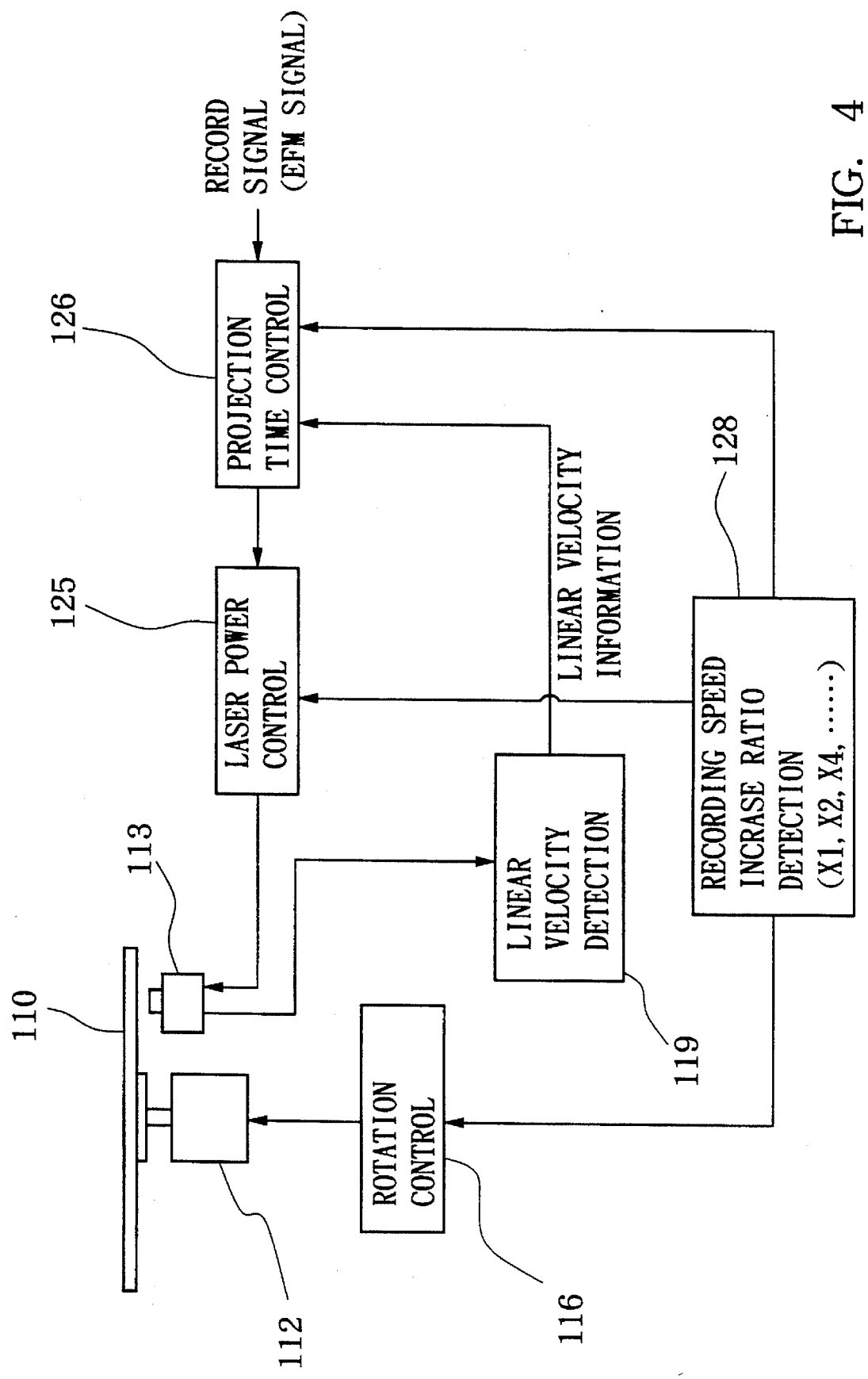
FIG. 4 is a block diagram showing another embodiment of the invention.
Figure 5:
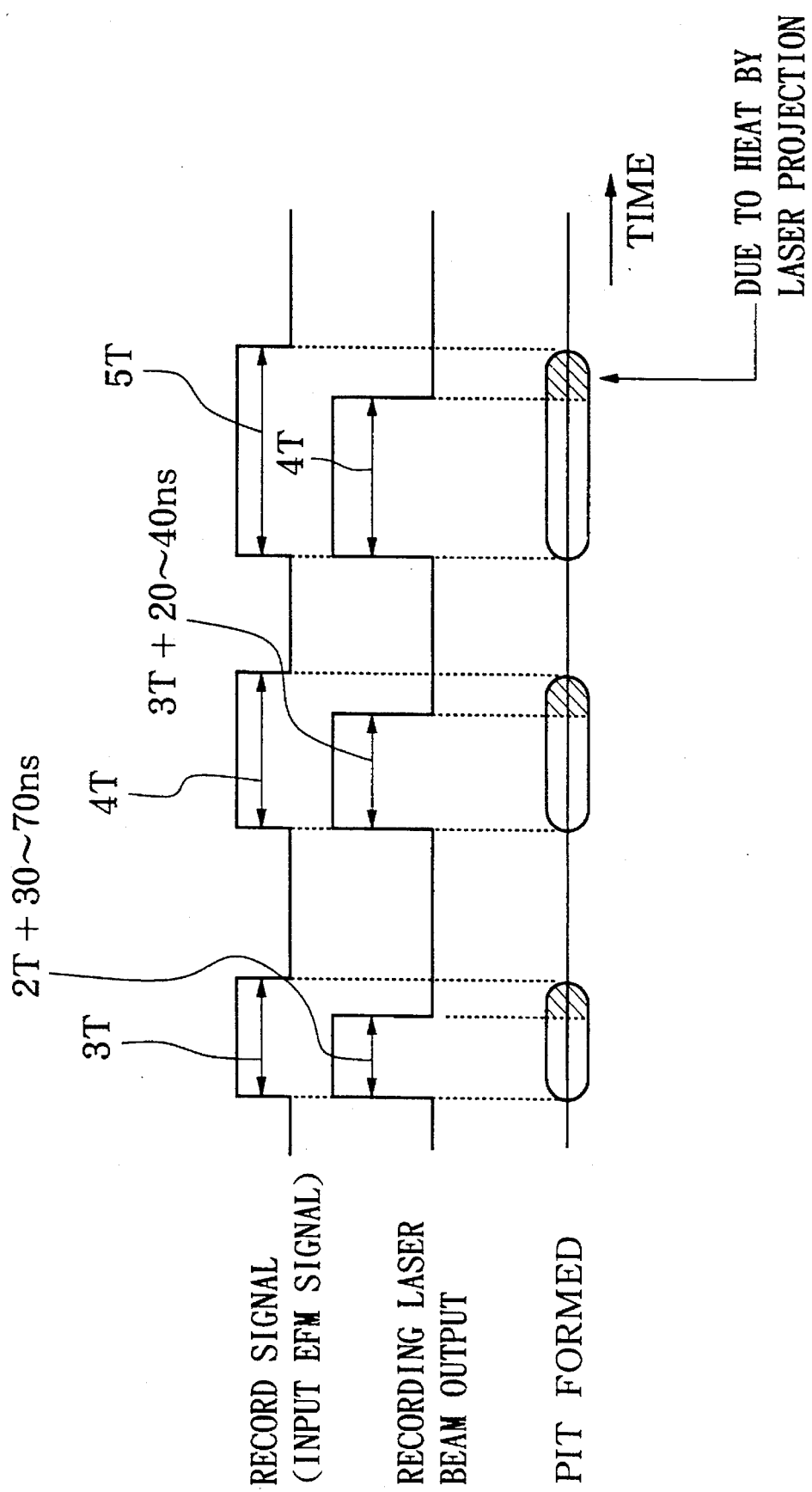
FIG. 5 is a time chart showing a manner of recording using the (n–1) strategy in a prior art device.
Figure 8:
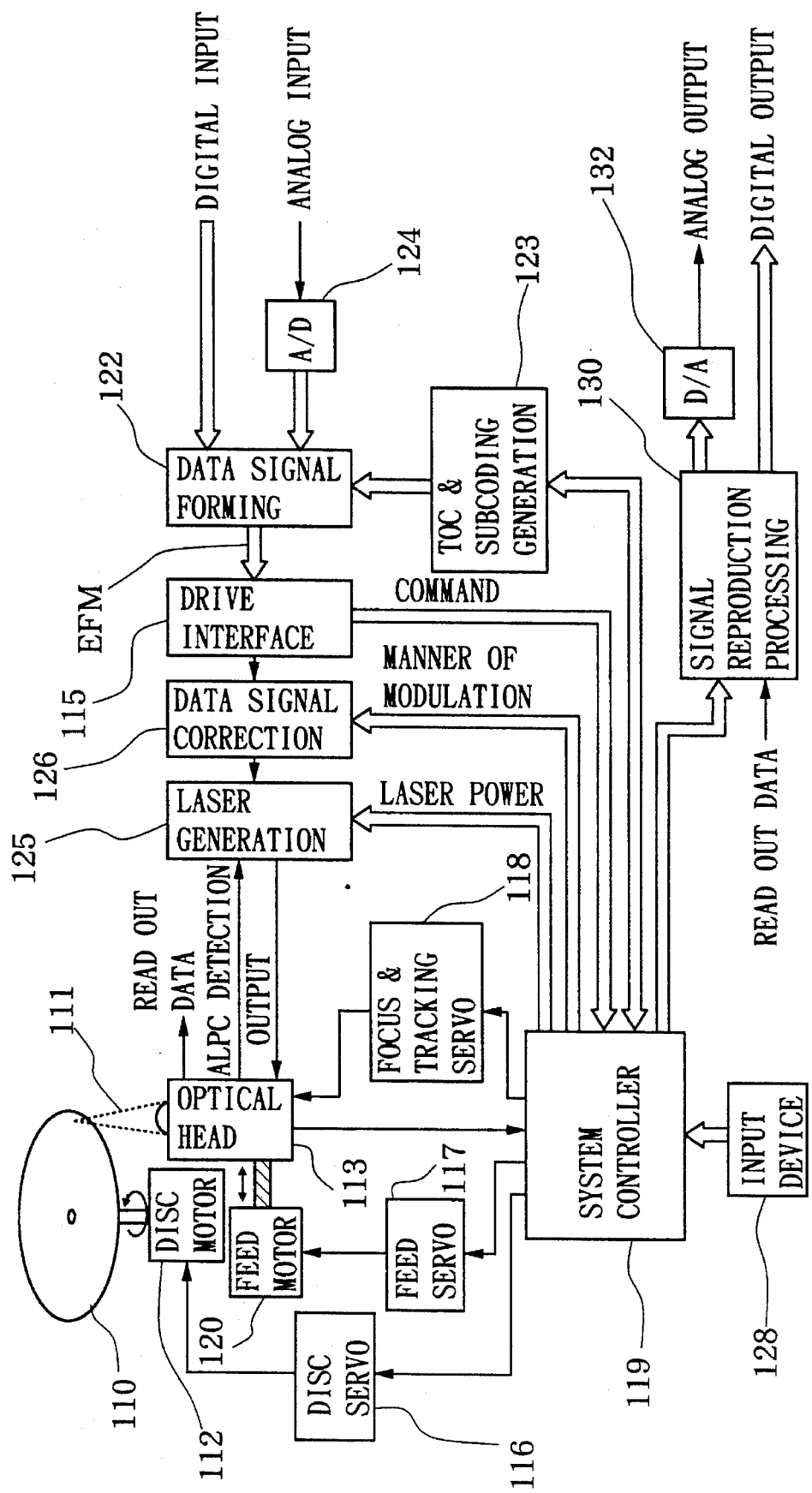
FIG. 8 is a block diagram showing an embodiment of an optical disc recording device made according to the invention.

A control block diagram of the optical disc recording device according to FIG. 8 is shown in FIG. 4. In FIG. 4, a recording speed increase ratio setting circuit 128 (i.e., the input device 128 in FIG. 8) sets a recording speed increase ratio by operation of the user or the like means. A rotation control circuit 116 (the disc servo circuit 116 in FIG. 8) drives and rotates the optical disc at the set recording speed increase ratio. A linear velocity detection circuit 119 detects a disc wobble from the output signal of the optical disc 110 and detects the linear velocity on the basis of the detected disc wobble. More specifically, an ATIP signal is recorded in the pregroove by FM modulation and, particularly, recording time of the disc is previously recorded with this ATIP signal in a lead-in portion so that the linear velocity can be obtained by calculating back from the recording time on the disc. Alternatively, the linear velocity can be calculated on the basis of a radial position of the optical head on the disc which is detected, in the state where the disc is controlled at a constant linear velocity on the basis of disc wobble, by a rotary encoder or the like device provided on the feed motor of the optical head and the revolution number of the disc which is detected by a rotary encoder or the like device provided on the disc motor.

A projection time control circuit 126 (the data signal correction circuit 125 in FIG. 8) controls projection time of recording laser beam 111 by imparting modulation according to the invention to the input EFM signal. A laser power control circuit 125 (the laser beam generation circuit 125 in FIG. 8) controls the laser power of the recording laser beam 111.

The projection time control of the recording laser beam 111 by the projection time control circuit 126 and the laser power control of the recording laser beam 111 by the laser power control circuit 126 will now be described. The projection time control circuit 126 controls the projection time of the recording laser beam in accordance with the recording speed increase ratio and the pit length of a pit to be formed in the following manner:

(1) In the case of the normal speed (IT:231 ns)

The projection time is set to $(n-1.5)T$ to $(n-1.0)T-\alpha(nT)$. At this time, the ratio of $\alpha(nT)$ to 1T (231 ns), i.e., a $(nT)/1T$, is set to 0% to 5% at $\alpha(3T)$, 0% to 5% at $\alpha(4T)$ and 0% at $\alpha(5T)$ to $\alpha(11T)$.

(2) In the case of the double speed (1T:16 ns)

The projection time is set to $(n-1.0)T$ to $(n-0.5)T-\alpha(nT)$. At this time, the ratio of $\alpha(nT)$ to 1T (116 ns) is set to 0% to 10% at $\alpha(3T)$, 0% to 10% at $\alpha(4T)$, 0% to 5% at $\alpha(5T)$ and 0% at $\alpha(6T)$ to $\alpha(11T)$.

(3) In the case of four times speed (1T:58 ns)

The projection time is set to $(n-0.5)T$ to $(n+0.1)T-\alpha(nT)$. At this time, the ratio of a $(nT)$ to 1T (58 ns) is set to 0% to 20% at $\alpha(3T)$, 0% to 20% at $\alpha(4T)$, 0% to 10% at $\alpha(5T)$, 0% to 10% at $\alpha(6T)$, 0% to 5% at $\alpha(7T)$, 0% to 5% at $\alpha(8T)$ and 0% at $\alpha(9T)$ to $(11T)$.

Figure 9:
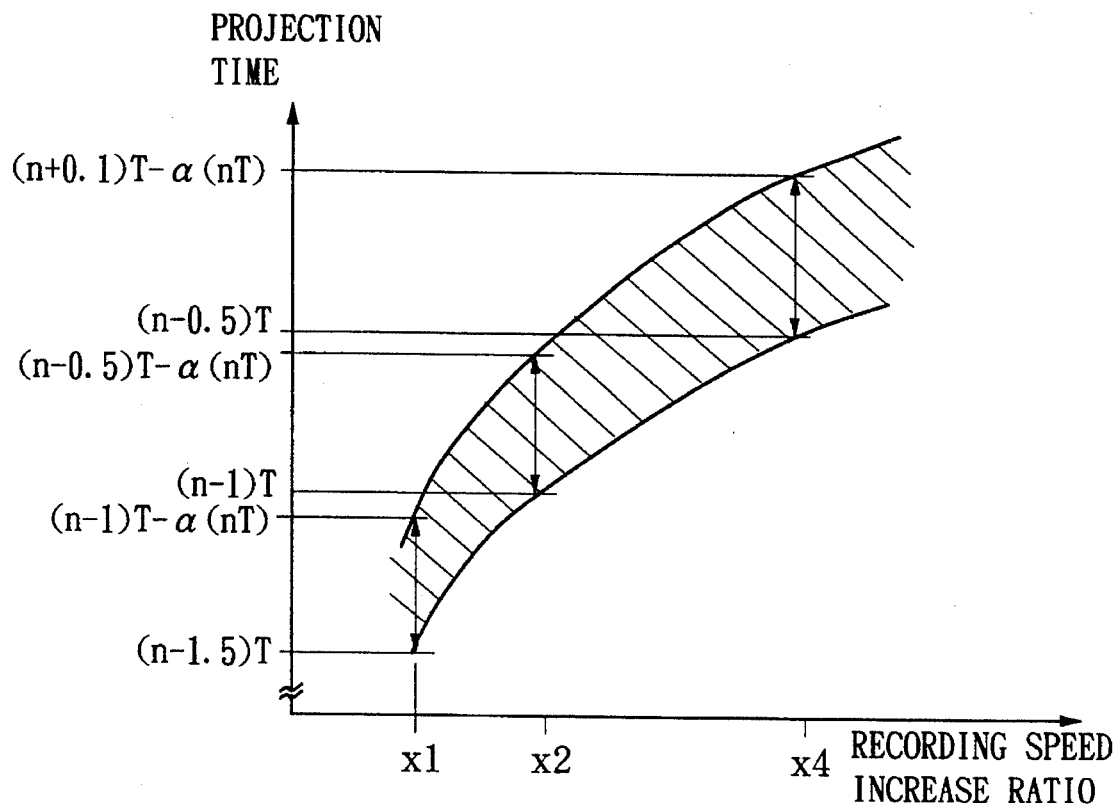
FIG. 9 is a characteristic diagram showing an example of the projection time control according to the invention.
Figure 11:
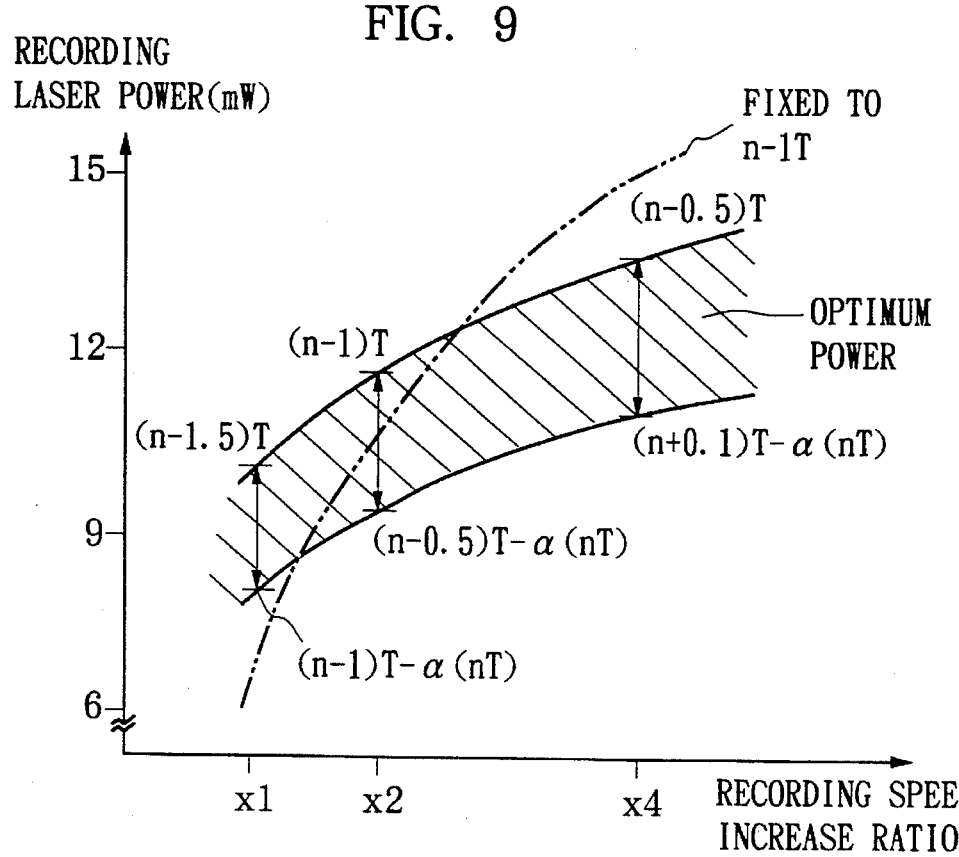
FIG. 11 is a characteristic diagram showing an optimum recording power at respective recording speed increase ratios in the case of recording with the projection time characteristic shown in FIG. 9.
Figure 10A:
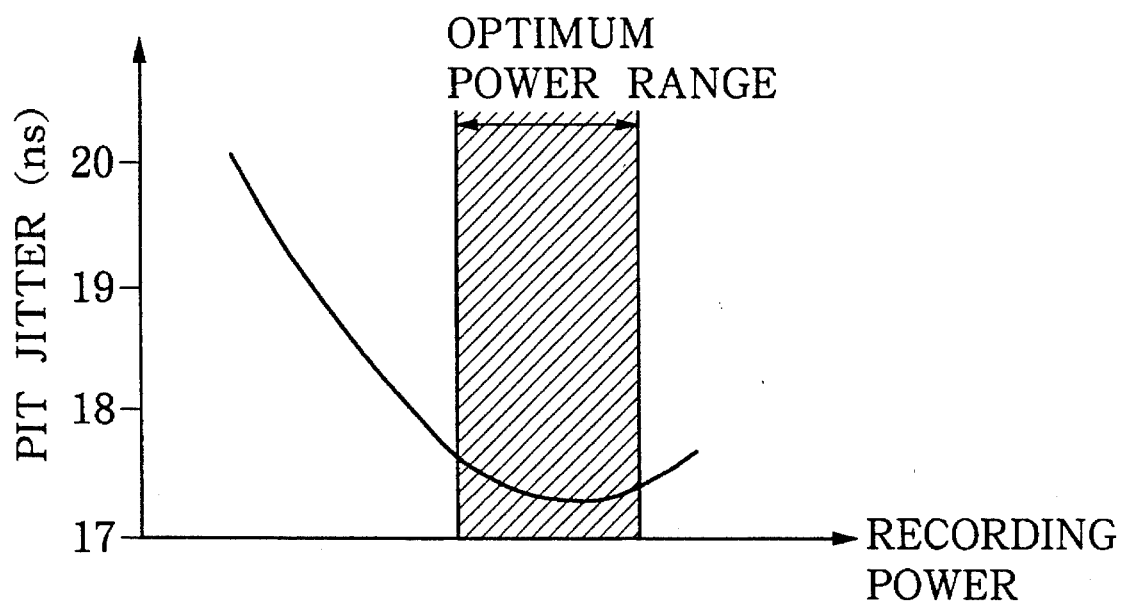
FIGS. 10A and 10B are characteristic diagrams showing change in jitter due to recording power in the case of recording at normal speed with the projection time characteristic shown in FIG. 9.
Figure 10B:
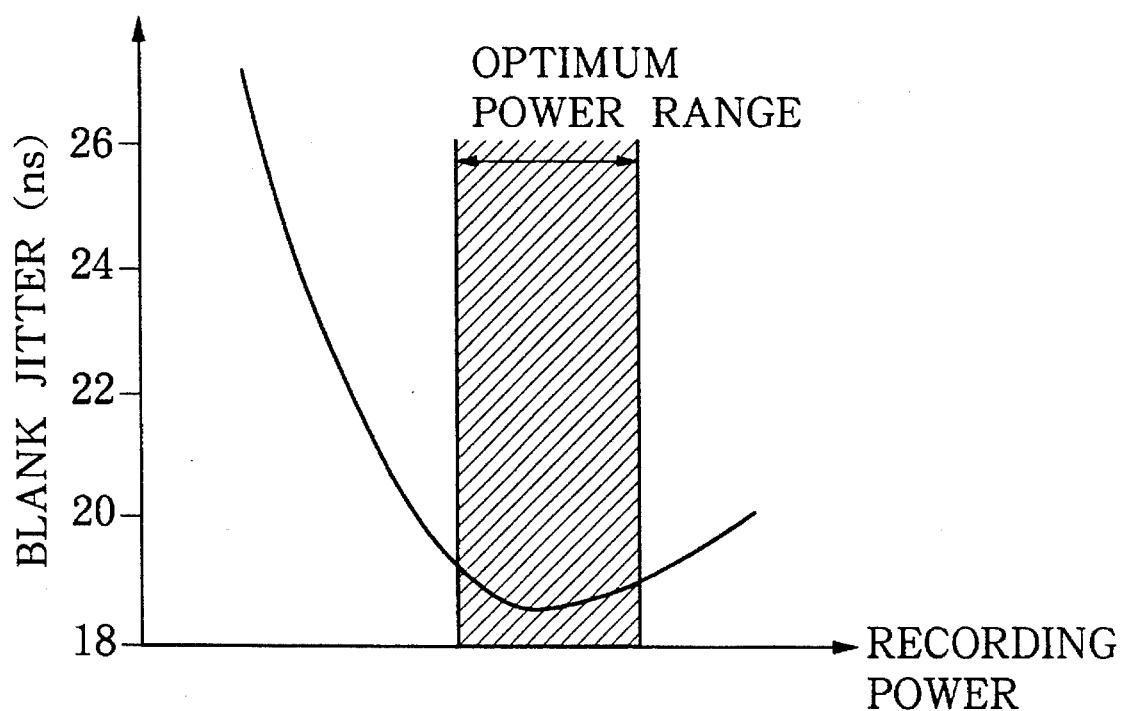

FIG. 9 is a graphical diagram showing relation between the recording speed increase ratio and the projection time according to the above described set contents. The laser power in this case should preferably be set within a range in which jitter becomes minimum when recording is made by setting the projection time as described above and changing the recording laser power variously. FIGS. 10A and 10B show measured data reflecting relation between the recording power and jitter with respect to the normal speed recording. FIG. 10A shows jitter in a pit portion and FIG. 10B shows jitter in a blank portion. In these figures, the shaded portions can be set as optimum power regions. FIG. 11 shows results of calculating minimum power ranges in this manner with respect to each recording speed increase ratio. According to FIG. 11, when the recording speed increase ratio becomes the double speed, the laser power becomes about 1.4 times as large as that required at the normal speed and when the recording speed increase ratio becomes the four times speed, the laser power becomes about double that required at the normal speed.

In FIG. 11, the chain and dot line indicates the laser power available when the projection time is fixed to $(n-1)T$. When the projection time is fixed to $(n-1)T$, the pit length tends to become larger than the standard length when the recording speed increase ratio is low and, therefore, it is necessary to reduce the recording power to cancel the tendency to the larger pit length. Conversely, the pit length tends to become smaller than the standard length when the recording speed increase ratio is high and, therefore, it is necessary to increase the recording power to cancel the tendency to the shorter pit length. Accordingly, when the projection time is fixed to $(n-1)T$, the recording laser power needs to be changed largely depending upon the recording speed increase ratio.

Figure 6:
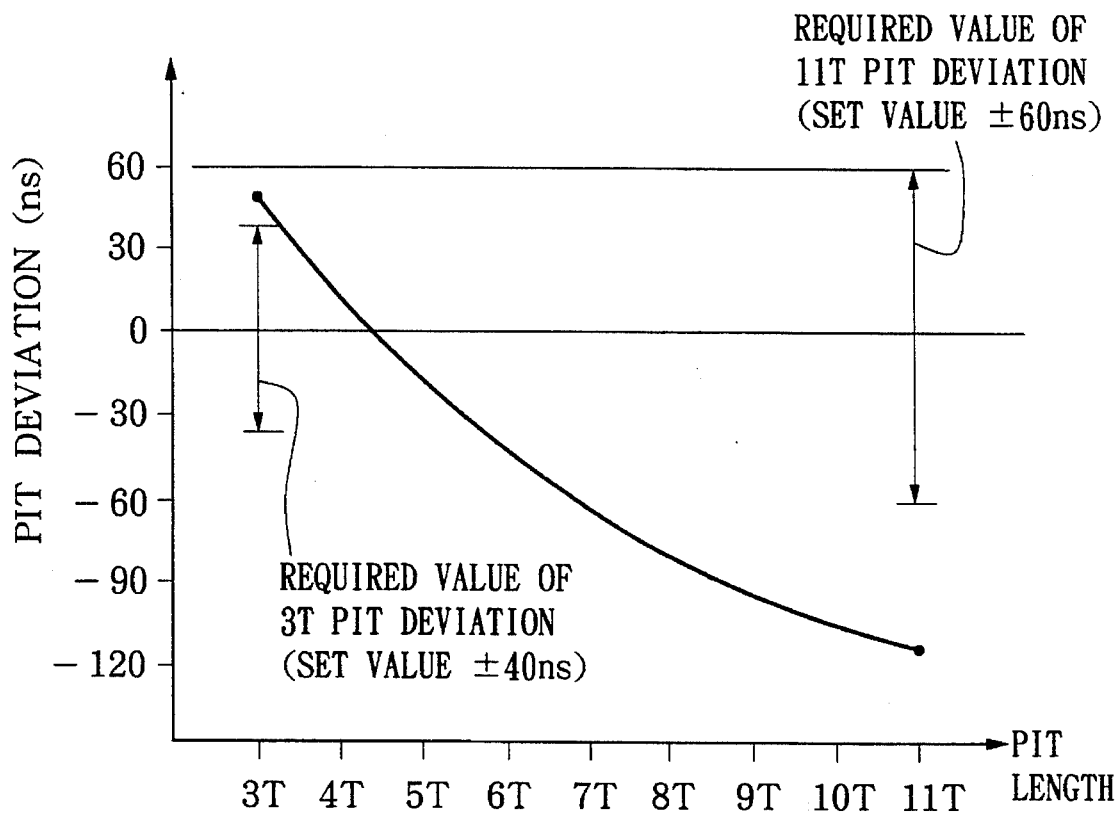
FIG. 6 is a characteristic diagram showing an amount of deviation in a pit length in a case where recording is made on a phthalocyanine disc by using the prior art (n–1) strategy.
Figure 7:
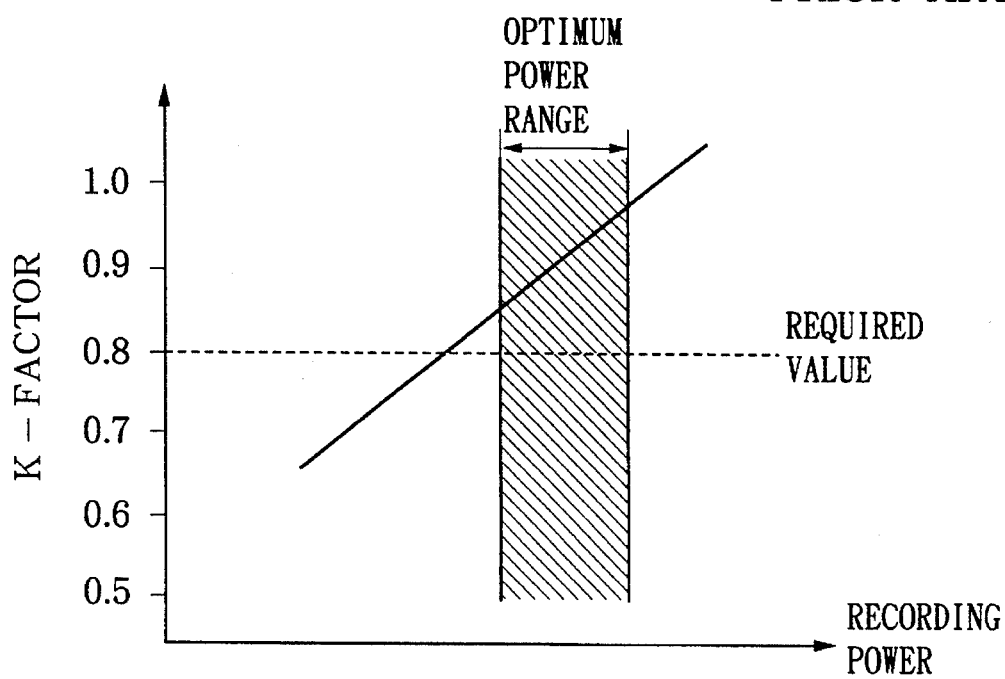
FIG. 7 is a characteristic diagram showing K-factor in a case where recording is made on a phthalocyanine disc by suing the prior art (n–1) strategy.
Figure 12:
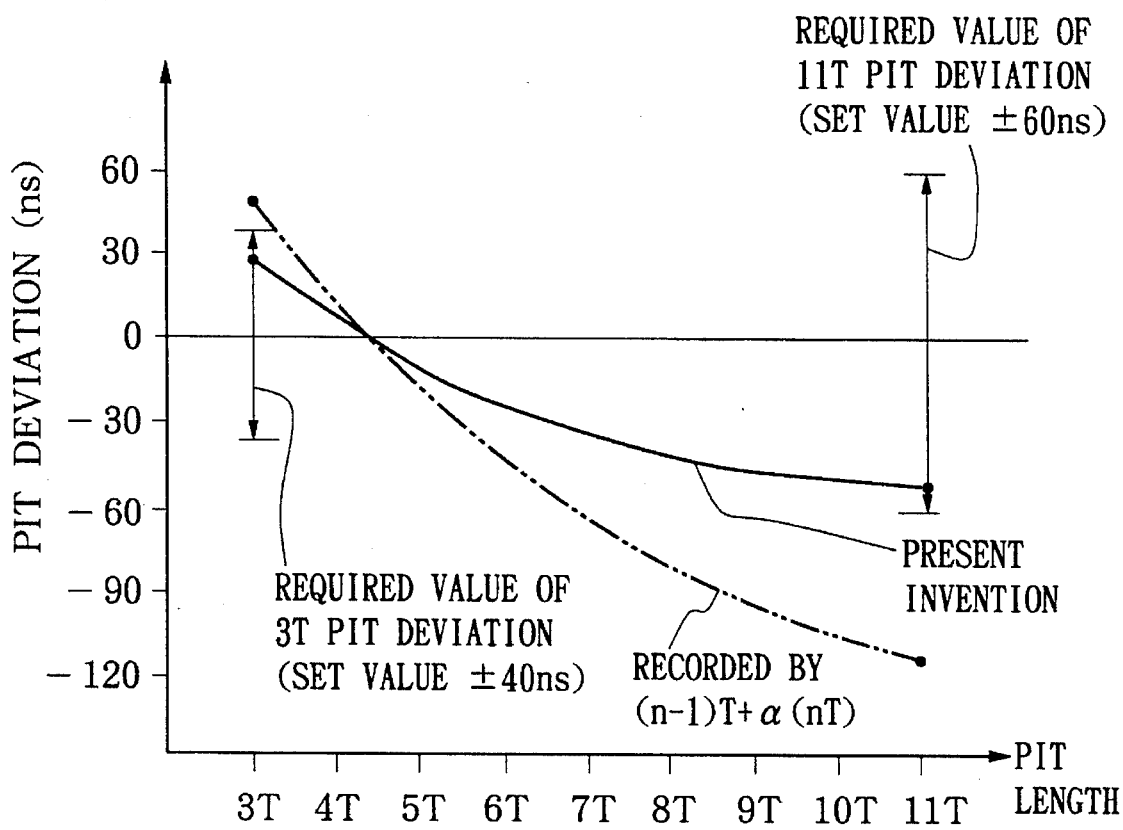
FIG. 12 is a characteristic diagram showing an amount of deviation in the pit length when recording is made with the projection time characteristic of FIG. 9 and the recording power characteristic of FIG. 11.
Figure 13:
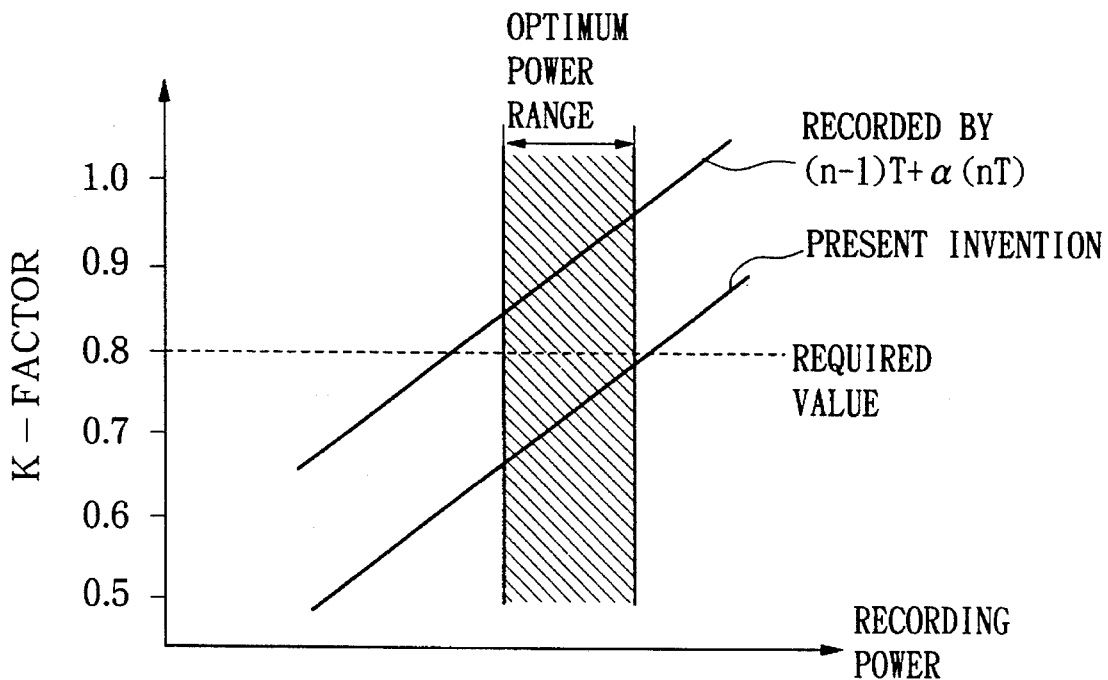
FIG. 13 is a characteristic diagram showing K-factor when recording is made with the projection time characteristic of FIG. 9 and the recording power of FIG. 11.

FIG. 12 shows the pit deviation (the amount of deviation of length of a pit formed from a set value) obtained when the projection time is set as shown in FIG. 9, the laser power is as shown in FIG. 11 and an EFM signal of the CD format is recorded on a phthalocyanine test sample disc at the normal speed and then this signal is reproduced from the disc. According to this figure, it will be understood that the conditions that 3T is within the standard value of ±40 ns and 11T is within the standard value of ±60 ns are satisfied. The chain and dot line indicates a characteristic obtained when recording is made at $(n-1)T+\alpha(nT)$ shown in FIG. 6. For the double speed and four times speed also, it has been found that the conditions of the pit deviation and the K-factor can be satisfied by setting the projection time as shown in FIG. 9 and the laser power as shown in FIG. 11.

Figure 14:
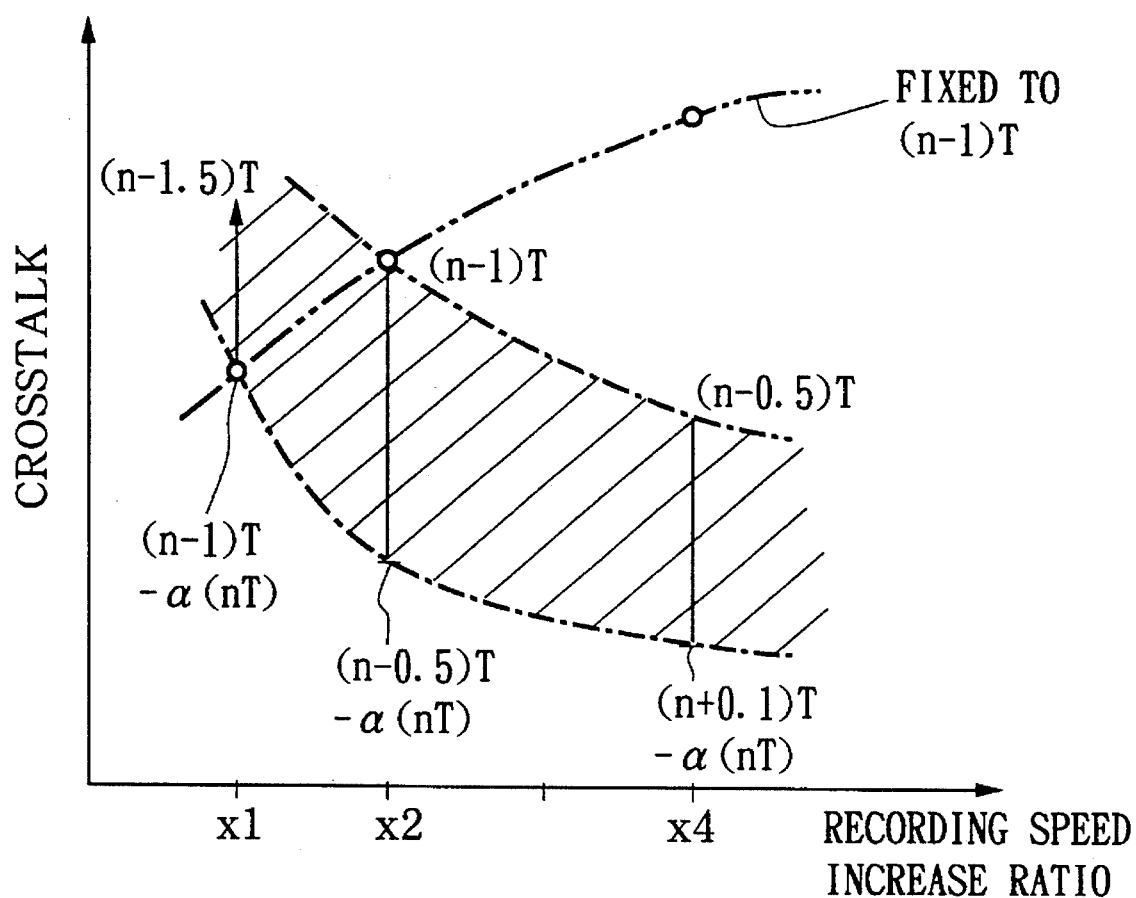
FIG. 14 is a characteristic diagram showing crosstalk when recording is made with the projection time characteristic of FIG. 9 and the recording power of FIG. 11.

FIG. 14 shows crosstalk of a reproduced signal which was recorded in the above described manner. The chain and dot line indicates crosstalk occurring when the projection time is fixed to $(n-1)T$. According to this figure, it will be understood that by recording with characteristics shown in FIGS. 9 and 11, crosstalk can be averaged at a relatively small value regardless of change in the recording speed increase ratio. This is supposed to take place for the reason that, by making the projection time shorter than $(n-1)T$ at a relatively low recording speed increase ratio and longer than $(n-1)T$ at a relatively large recording speed increase ratio as shown in FIG. 9, change in the optimum power range becomes smaller than in the case where $(n-1)T$ is constant as shown in FIG. 11 and, therefore, the laser power at a high recording speed increase ratio can be held at a low value whereby diffusion of heat in lateral direction (direction of width of the track) is restrained and increase in the width of the pit formed thereby is restrained. Further, since the laser power can be increased when the recording speed increase ratio is low, a pit can be formed clearly so that the quality of a recorded signal can be improved.

Figure 15A:
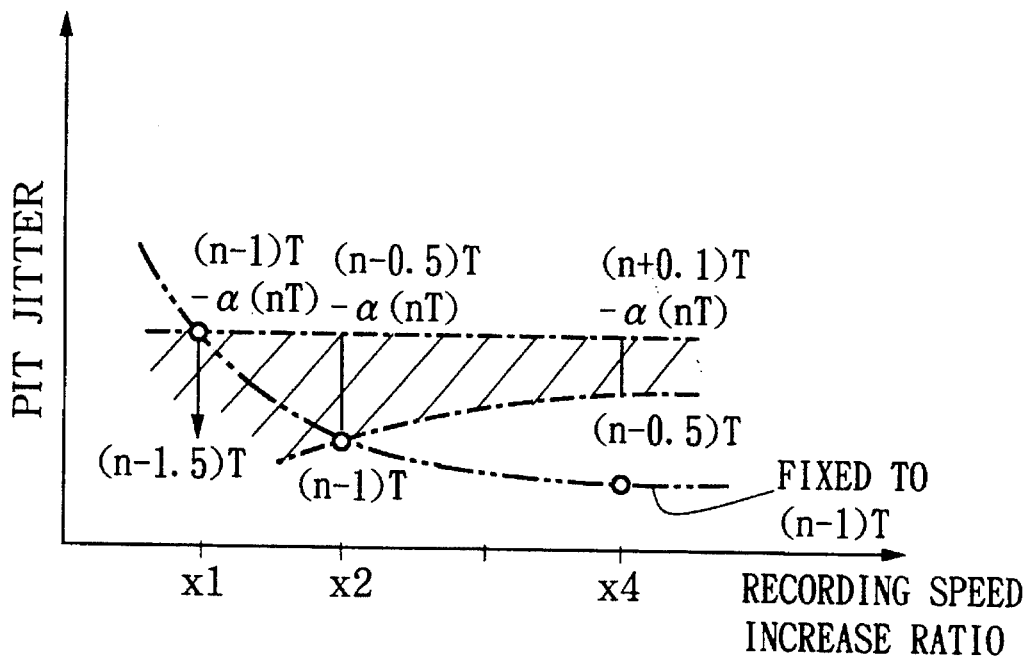
FIGS. 15A and 15B are diagrams showing jitter characteristics when recording is made with the projection time characteristic of FIG. 9 and the recording power of FIG. 11.
Figure 15B:
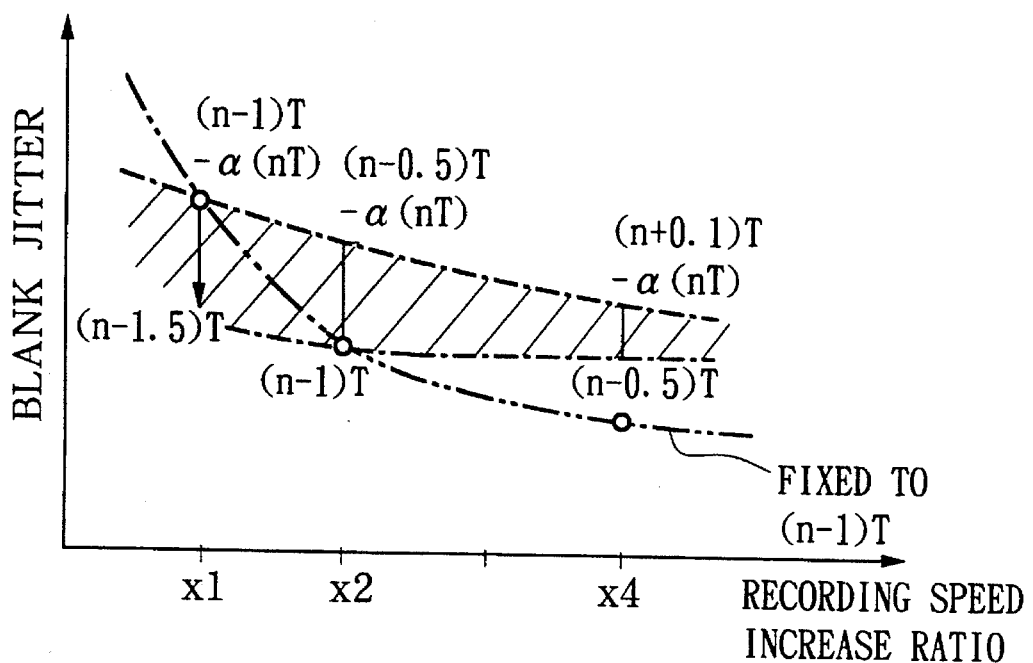

FIGS. 15A and 15B show pit jitter and blank jitter occurring when recording is made in the above described manner. According to these figures, it will be understood that both pit jitter and blank jitter are averaged at relatively low values as compared with a case where recording is made with the projection time being fixed to $(n-1)T$.

In the above described embodiment, description has been made with respect to the normal speed, double speed and four times speed. The invention however can be applied to a case where recording is made at a higher recording speed increase ratio.

In the above described embodiment, description has been made with respect to a case where recording is made on a phthalocyanine disc. In a case where recording is made on a cyanine disc, an arrangement may be made so that switching is made between the $(n-J)T-\alpha(nT)$ strategy and the conventional $(n-J)T+\alpha(nT)$ strategy.

What is claimed is:

1. An optical disc recording device for recording on an optical disc, the optical disc recording device comprising;

control information storage means for storing a plurality of control information for controlling a laser modulation system used during a recording mode for a plurality of disc types:

disc type detection means for detecting the type of the optical disc and generating information on the type of the optical disc; and recording control means for using the information on the disc type of the optical disc on which recording is to be made to read out control information corresponding to the the disc type of the optical disc from the control information storage means and for using contents of the control information to perform recording on the optical disc;

wherein said control information storage means also stores basic control information which is irrelevant to the type of the optical disc; and wherein said recording control means reads out the basic control information and uses contents of the basic control information when said disc type detection means has not detected the type of the optical disc.

2. An optical disc recording device for recording on an optical disc, wherein said optical disc recording device uses a recording laser beam that forms pits of recording pit lengths of 3T to 11T on an optical disc using a phthalocyanine dyestuff, the optical disc recording device comprising:

control information storage means for storing a plurality of control information for controlling a laser modulation system used during a recording mode for a plurality of disc types;

recording control means for using information on the disc type of an optical disc on which recording is to be made to read out control information corresponding to the disc type of the optical disc from the control information storage means and for using contents of the control information to perform recording on the optical disc; and projection time control means for controlling a projection time of the recording laser beam, wherein the projection time with respect to a pit length nT of a pit is set by:

$(n-J)T-\alpha(nT)$ where n is a value between 3 to 11
J is a constant and
$\alpha(3T) \geq \alpha(4T) \geq \alpha(5T) \geq \ldots \geq \alpha(11T)$
$\alpha(3T) \geq \alpha(11T)$.

3. An optical disc recording device as defined in claim 2, wherein when the projection time control means forms pits of the same length, said projection time control means increases the ratio of the $\alpha(nT)$ to a length of 1T for each recording speed increase ratio as the recording speed increase ratio increases.

4. An optical disk recording device as defined in claim 2, wherein said recording control means further comprises laser power control means for controlling recording power of the recording laser beam, wherein said projection time control means increases the value of J when the recording speed increases ratio decreases, and decreases the value of J when the recording speed increase ratio increases, and wherein said laser power control means adjusts the laser power to a value necessary for forming a predetermined pit length using the projection time having the adjusted value of J.

5. A method for recording information on an optical disc, the method comprising the steps of:

storing, in a memory, a plurality of control information for controlling a laser modulation system used during a recording mode for a plurality of disc types;

detecting the type of the optical disc and generating information on the type of the optical disc;

using the information on the disc type of an optical disc on which recording is to be made to read out control information corresponding to the disc type of the optical disc from the memory;

recording on the optical disc using contents of the control information;

storing basic control information which is irrelevant to the type of the optical disc; and reading out and using the basic control information when the information of the disc type is not detected.

6. A method for recording information on an optical disc using a recording laser for forming pits of recording pit lengths of 3T to 11T on an optical disc using a phthalocyanine dyestuff, the method comprising the steps of:

storing, in a memory, a plurality of control information for controlling a laser modulation system used during a recording mode for a plurality of disc types;

using information on the disc type of an optical disc on which recording is to be made to read out control information corresponding to the disc type of the optical disc from the memory;

recording on the optical disc using contents of the control information; and controlling a projection time of a recording laser beam, wherein the projection time with respect to a pit length nT of a pit is set by:

$(n-J)T-\alpha(nT)$ where n is a value between 3 to 11
J is a constant and
$\alpha(3T) \geq \alpha(4T) \geq \alpha(5T) \geq \ldots \geq \alpha(11T)$
$\alpha(3T) \geq \alpha(11T)$.

7. An optical disc recording device for recording on an optical disc, the optical recording device, comprising:

a control information storage circuit that stores a plurality of control information for controlling a laser modulation system used during a recording mode for a plurality of disc types;

a disc type detection circuit that detects the type of the optical disc and generates information on the type of the optical disc; and a recording control circuit that uses the information on the disc type of an optical disc on which recording is to be made to read out control information corresponding to the disc type of the optical disc from the control information storage circuit and that uses the control information to perform recording on the optical disc, wherein the control information storage circuit also stores basic control information which is irrelevant to the type of the optical disc; and wherein said recording control circuit reads out the basic control information and uses contents of the basic control information when said disc type detection circuit has not detected the type of the optical disc.

8. An optical disc recording device for recording on an optical disk and that uses a recording laser beam that forms pits of recording pit lengths of 3T to 11T on an optical disc using a phthalocyanine dyestuff, the optical disc recording device comprising:

a control information storage circuit that stores a plurality of control information for controlling a laser modulation system used during a recording mode for a plurality of disc types;

a recording control circuit that uses information on the disc type of an optical disc on which recording is to be made to read out control information corresponding to the disc type of the optical disc from the control information storage circuit and that uses control information to perform recording on the optical disc; and a projection time control circuit that controls a projection time of the recording laser beam, wherein the projection time with respect to a pit length nT of a pit is set by:

$(n-J)T - \alpha(nT)$ where n is a value between 3 to 11

J is a constant and $\alpha(3T) \geqq \alpha(4T) \geqq \alpha(5T) \geqq \ldots \geqq \alpha(11T)$ $\alpha(3T) \geqq \alpha(11T)$.

9. An optical disc recording device as defined in claim 8, wherein when the projection time control circuit forms pits of the same length, and wherein the projection time control circuit increases the ratio of the $\alpha(nT)$ to a length of 1T for each recording speed increase ratio as the recording speed increase ration increases.

10. An optical disk recording device as defined in claim 8, wherein the recording control circuit further includes a laser power control circuit that controls a recording power of the recording laser beam, wherein the projection time control circuit increases the value of J when the recording speed increase ratio decreases, and decreases the value of J when the recording speed increase ratio increases, and wherein the laser power control circuit adjusts the laser power to a value necessary for forming a predetermined pit length using the projection time having the adjusted value of J.

* * * * *